United States Patent
Bicerano

(10) Patent No.: US 9,732,269 B2
(45) Date of Patent: *Aug. 15, 2017

(54) PROPPANTS CONTAINING DISPERSED PIEZOELECTRIC OR MAGNETOSTRICTIVE FILLERS OR MIXTURES THEREOF, TO ENABLE PROPPANT TRACKING AND MONITORING IN A DOWNHOLE ENVIRONMENT

(71) Applicant: Sun Drilling Products Corporation, Belle Chasse, LA (US)

(72) Inventor: Jozef Bicerano, Midland, MI (US)

(73) Assignee: Sun Drilling Products Corporation, Belle Chasse, LA (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/860,160

(22) Filed: Sep. 21, 2015

(65) Prior Publication Data

US 2016/0009987 A1 Jan. 14, 2016

Related U.S. Application Data

(63) Continuation of application No. 13/217,735, filed on Aug. 25, 2011, now Pat. No. 9,140,111, which is a continuation of application No. 12/206,867, filed on Sep. 9, 2008, now Pat. No. 8,006,754.

(60) Provisional application No. 61/042,727, filed on Apr. 5, 2008.

(51) Int. Cl.
*C09K 8/80* (2006.01)
*E21B 43/267* (2006.01)

(52) U.S. Cl.
CPC .............. *C09K 8/80* (2013.01); *C09K 8/805* (2013.01); *E21B 43/267* (2013.01)

(58) Field of Classification Search
None
See application file for complete search history.

(56) References Cited

U.S. PATENT DOCUMENTS

| | | | |
|---|---|---|---|
| 3,843,566 A | 10/1974 | Barrett |
| 4,427,793 A | 1/1984 | Reed et al. |
| 5,597,784 A | 1/1997 | Sinclair et al. |
| 6,248,838 B1 | 6/2001 | Albright |
| 6,330,916 B1 | 12/2001 | Rickards et al. |
| 6,451,953 B1 | 9/2002 | Albright |
| 6,499,536 B1 | 12/2002 | Ellingsen |
| 6,607,036 B2 | 8/2003 | Ranson et al. |
| 6,632,527 B1 | 10/2003 | McDaniel et al. |
| 6,737,386 B1 | 5/2004 | Moorhouse et al. |
| 6,759,463 B2 | 7/2004 | Lorah et al. |
| 7,032,664 B2 | 4/2006 | Lord et al. |
| 7,082,993 B2 | 8/2006 | Ayoub et al. |
| 7,189,767 B2 | 3/2007 | Gore et al. |
| 7,544,643 B2 | 6/2009 | Huang |
| 7,632,688 B2 | 12/2009 | Oka et al. |
| 7,803,740 B2 | 9/2010 | Bicerano et al. |
| 7,803,741 B2 | 9/2010 | Bicerano et al. |
| 7,803,742 B2 | 9/2010 | Bicerano et al. |
| 7,836,952 B2 | 11/2010 | Fripp |
| 8,006,754 B2 | 8/2011 | Bicerano |
| 2005/0098315 A1 | 5/2005 | Danican et al. |
| 2006/0037755 A1 | 2/2006 | Knobloch |
| 2006/0102345 A1 | 5/2006 | McCarthy et al. |
| 2007/0021309 A1 | 1/2007 | Bicerano |
| 2007/0066491 A1 | 3/2007 | Bicerano et al. |
| 2007/0154268 A1 | 7/2007 | Barron et al. |
| 2007/0161515 A1 | 7/2007 | Bicerano |
| 2007/0166541 A1 | 7/2007 | Smith et al. |
| 2007/0181302 A1 | 8/2007 | Bicerano |
| 2007/0256830 A1 | 11/2007 | Entov et al. |
| 2007/0259183 A1 | 11/2007 | Knobloch |
| 2007/0287636 A1 | 12/2007 | Heller et al. |
| 2008/0062036 A1 | 3/2008 | Funk et al. |
| 2008/0149345 A1 | 6/2008 | Marya et al. |
| 2009/0029878 A1 | 1/2009 | Bicerano |

FOREIGN PATENT DOCUMENTS

| | | |
|---|---|---|
| EP | 1904601 | 12/2006 |
| WO | 9927229 A1 | 6/1999 |

(Continued)

OTHER PUBLICATIONS

International Search Report for PCT/US2009/052825 dated Oct. 6, 2009.
Written Opinion for PCT/US2009/052825 dated Oct. 6, 2009.

*Primary Examiner* — John J Figueroa
(74) *Attorney, Agent, or Firm* — Morgan, Lewis & Bockius, LLP

(57) ABSTRACT

In one aspect, the invention relates to a method for "tagging" proppants so that they can be tracked and monitored in a downhole environment, based on the use of composite proppant compositions containing dispersed fillers whose electromagnetic properties change at a detectable level under a mechanical stress such as the closure stress of a fracture. In another aspect, the invention relates to composite proppant compositions containing dispersed fillers whose electromagnetic properties change under a mechanical stress such as the closure stress of a fracture. The currently preferred embodiments use substantially spherical thermoset nanocomposite particles where the matrix comprises a terpolymer of styrene, ethylvinylbenzene and divinylbenzene, a PZT alloy manifesting a strong piezoelectric effect or Terfenol-D manifesting giant magnetostrictive behavior is incorporated to provide the ability to track in a downhole environment, and carbon black particles possessing a length that is less than 0.5 microns in at least one principal axis direction may optionally be incorporated as a nanofiller.

16 Claims, No Drawings

(56) References Cited

FOREIGN PATENT DOCUMENTS

| | | | |
|---|---|---|---|
| WO | 02060681 | A1 | 8/2002 |
| WO | 2004087798 | A1 | 10/2004 |
| WO | 2004092732 | A1 | 10/2004 |
| WO | 2005100746 | A1 | 10/2005 |
| WO | 2006023537 | A2 | 3/2006 |
| WO | 2006072069 | A2 | 7/2006 |
| WO | 2006119261 | A2 | 11/2006 |
| WO | 2006135892 | A2 | 12/2006 |
| WO | 2007146067 | A2 | 12/2007 |
| WO | 2008124080 | A1 | 10/2008 |
| WO | 2009005880 | A2 | 1/2009 |
| WO | 2009124029 | A1 | 10/2009 |
| WO | 2010019424 | A1 | 8/2010 |

PROPPANTS CONTAINING DISPERSED PIEZOELECTRIC OR MAGNETOSTRICTIVE FILLERS OR MIXTURES THEREOF, TO ENABLE PROPPANT TRACKING AND MONITORING IN A DOWNHOLE ENVIRONMENT

CROSS-REFERENCE TO RELATED APPLICATIONS

The present application is a continuation of U.S. patent application Ser. No. 13/217,735, filed Aug. 25, 2011, now allowed, which is a continuation of U.S. patent application Ser. No. 12/206,867, filed Sep. 9, 2008, now granted as U.S. Pat. No. 8,006,754, which in turn claims priority benefit from U.S. Provisional Application Ser. No. 61/042,727, filed Apr. 5, 2008, (now expired), all of which are incorporated by reference herein in their entireties.

FIELD OF THE INVENTION

The present invention relates to a new method for "tagging" proppants so that they can be tracked and monitored in a downhole environment. This method is based on the use of new composite proppant compositions containing dispersed fillers whose electromagnetic properties change under a mechanical stress such as the closure stress of a fracture. These changes of electromagnetic properties are detected to track and monitor the locations of the proppants.

BACKGROUND

Proppants are solids, such as sand, ceramic, polymer, or composite particles, that are often used during fracture stimulation to keep a fracture open by resisting the closure stress applied by the geological formation above the fracture.

In many situations, a substantial portion of the proppant does not remain in a fracture where it has been placed but instead flows back to the wellbore, so that it is valuable to be able to assess the extent of any flowback. Furthermore, a knowledge of the locations of the proppant particles can also provide valuable information about the fracture geometry. The ability to monitor the locations of the proppant particles over time after their placement in a downhole environment is, therefore, a highly desirable objective. Progress towards the attainment of this objective has hitherto been both difficult to make and limited in its scope.

The patent to Ayoub et al. (U.S. Pat. No. 7,082,993), assigned to Schlumberger Technology Corporation, provides for a "Means and Method for Assessing the Geometry of a Subterranean Fracture During or After a Hydraulic Fracturing Treatment". Disclosed therein is a method for determining the geometry of a hydraulic fracture where said geometry can be inferred from the use of a mixed proppant composition comprised of ferrous/magnetic fibers embedded in said proppant. The contrast in magnetic fields between the borehole environment and the surroundings can give the operator an indication of the fracture internals.

The patent application publication to Knobloch (U.S. 20060037755) provides for a "Solid State Pump". Disclosed therein is a proppant containing a magnetostrictive material that is moved within an internal formation such as a geological reservoir of hydrocarbon through a solid state pumping action brought about by the introduction of a magnetic source.

The patent application publication to McCarthy et al. (US 20060102345 A1) describes a "Method of Estimating Fracture Geometry, Compositions and Articles Used for the Same". This method involves mapping a subterranean fracture by using metallic particles with a certain dielectric constant that are contained within a proppant, and pulsing said particles with a particular electromagnetic radiation to perform said mapping.

The patent application publication to Entov et al. (U.S. 20070256830), assigned to Schlumberger Technology Corporation, provides for a "Method and an Apparatus for Evaluating a Geometry of a Hydraulic Fracture in a Rock Formation". Disclosed therein is the use of an electrolyte-based proppant that, when injected into a borehole in a hydraulic fracturing event, causes an electrokinetic effect from the flow of said proppant through the borehole aperture. The geometry of the hydraulic fracture is mapped out via the detection of electric and/or magnetic fields triggered by the aforementioned electrokinetic phenomenon.

The following two books are recommended to readers who may be interested in general background information on piezoelectric and/or magnetostrictive materials: APC International, Ltd., "Piezoelectric Ceramics: Principles and Applications" (2002); and G. Engdahl (editor), "Handbook of Giant Magnetostrictive Materials", Academic Press, New York (2000).

SUMMARY OF THE INVENTION

The present invention relates to a method for "tagging" proppants so that they can be tracked and monitored in a downhole environment. This new method is based on the use of new composite proppant compositions containing from approximately 0.001% to approximately 75% by volume of dispersed fillers whose electromagnetic properties change under a mechanical stress such as the closure stress of a fracture. These changes of electromagnetic properties are detected by means of any suitable technique, to track and monitor the locations of the proppants. Suitable techniques include, but are not limited to, microseismic monitoring technology.

While the particle compositions of the invention were developed with proppant tracking applications specifically in mind, it will be obvious to workers of ordinary skill in the field of particulate materials that such particles can also be used beneficially in many other applications by tailoring specific embodiments of the invention to meet the targeted performance requirements of other applications.

Any suitable material (such as, but not limited to, a ceramic or a polymer) may be used as a matrix in some embodiments of the composite proppant compositions of the invention. In some other embodiments, the ingredients of a composite proppant of the invention can be agglomerated and held together by means of a binder material. Inclusions manifesting the piezoelectric effect or the magnetostrictive effect, or mixtures thereof, can be incorporated as dispersed fillers that serve as "tags" and thus enable the tracking of the proppant locations in a downhole environment. The proppants of the invention may also contain any other desired ingredients; including, but not limited to, rigid (mechanically reinforcing) fillers, impact modifiers, protective coatings, or combinations thereof.

The imposition of a mechanical stress results in the generation of an electric field by a piezoelectric material and in the generation of a magnetic field by a magnetostrictive material. A change in the magnitude and/or direction of an imposed mechanical stress results in a change in the electric field generated by a piezoelectric material and a change in the magnetic field generated by a magnetostrictive material. The factors governing the ability of a material to manifest piezoelectric or magnetostrictive behavior are well-established. Many materials are known to manifest such behaviors to varying magnitudes. Any of these materials may be used as the piezoelectric or magnetostrictive fillers in the proppants of the invention.

Strongly piezoelectric and/or giant magnetostrictive materials are sometimes significantly more expensive than the types of materials from which commercial proppants are generally manufactured. There is, therefore, often a significant economic advantage to the use of blends of proppants, where the blend includes a quantity of "tagged" proppants that is sufficient to produce a signal of detectable magnitude mixed with less expensive "untagged" proppants. The use of "tagged" proppants in such proppant blends, at amounts of at least 1% by weight of the blend, is also an aspect of the present invention.

DESCRIPTION OF THE PREFERRED EMBODIMENTS

Details will now be provided on the currently preferred embodiments of the invention. These details will be provided without reducing the generality of the invention. With the benefit of this disclosure, persons of ordinary skill in the field of the invention can readily imagine many additional embodiments that fall within the full scope of the invention as taught in the SUMMARY OF THE INVENTION section.

Piezoelectric particles, magnetostrictive particles, or mixtures thereof, are dispersed in a thermoset polymer matrix in the preferred embodiments of the invention. These preferred embodiments are prepared via suspension polymerization. They are substantially spherical in shape; where a substantially spherical particle is defined as a particle having a roundness of at least 0.7 and a sphericity of at least 0.7, as measured by the use of a Krumbien/Sloss chart using the experimental procedure recommended in International Standard ISO 13503-2, "Petroleum and natural gas industries—Completion fluids and materials—Part 2: Measurement of properties of proppants used in hydraulic fracturing and gravel-packing operations" (first edition, 2006), Section 7, for the purposes of this disclosure.

The thermoset matrix used in the most preferred embodiments consists of a terpolymer of styrene (St), ethylvinylbenzene (EVB), and divinylbenzene (DVB) (U.S. Application No. 20070021309). The extent of crosslinking in these embodiments can be adjusted by varying the percentage of the crosslinker (DVB) in the reactive precursor mixture and/or by postcuring via heat treatment after polymerization. In one such embodiment, the thermoset polymer matrix may also contain a dispersed nanofiller, where, by definition, a nanofiller possesses at least one principal axis dimension whose length is less than 0.5 microns (500 nanometers). In one embodiment, the dispersed nanofiller may be carbon black, as described in U.S. Application No. 20070066491. In another embodiment, the thermoset polymer matrix may also contain an impact modifier, as described in U.S. Application No. 20070161515. A protective coating may, optionally, be applied to these embodiments. In some embodiments, one or more of the St, EVB and DVB monomers used in the reactive precursor mixture may be replaced by reactive ingredients obtained and/or derived from renewable resources such as vegetable oils and/or animal fats (U.S. Application No. 20070181302). U.S. Application Nos. 20070021309, 20070066491, 20070161515, and 20070181302 are incorporated herein in their entirety by reference.

The preferred embodiments use one or more of piezoelectric and magnetostrictive fillers whose compositions cause them to manifest these effects very strongly. The tracking of the "tagged" proppant particles by means of a signal that is readily distinguished from the background is thus facilitated. The preferred piezoelectric fillers fall into the category of ferroelectric materials; defined in terms of being spontaneously polarizable and manifesting reversible polarization, and exemplified by piezoelectric ceramics with the perovskite crystallographic structure type such as lead zirconate titanate (PZT) and barium titanate. The preferred magnetostrictive fillers manifest "giant magnetostriction"; as exemplified by Terfenol-D (a family of alloys of terbium, iron and dysprosium), Samfenol (a family of alloys of samarium and iron, sometimes also containing other elements such as dysprosium), and Galfenol (a family of alloys of gallium and iron, sometimes also containing other elements).

Different products in some of the preferred classes of piezoelectric or magnetostrictive materials named above manifest very different temperature dependences for the electric field or the magnetic field generated by an applied stress. A key criterion in selecting piezoelectric or magnetostrictive fillers for use in the preferred embodiments of the invention is that the temperature dependence of the electric field or the magnetic field generated by an applied stress should be as weak as possible over a downhole use temperature range of the proppant. In practice, piezoelectric or magnetostrictive materials that meet this requirement generally have (a) a Curie temperature ($T_c$) that is significantly above the maximum temperature that a proppant is expected to encounter during use, and (b) no pronounced secondary structural relaxations occurring between the minimum and maximum temperatures that a proppant is expected to encounter during use. When a piezoelectric or magnetostrictive filler satisfies these criteria, the generated electric field or magnetic field can often be related in a relatively simple manner to the location and amount of the proppant particles and to the closure stress without needing to deconvolute the effects of the temperature dependence.

The sizes of the piezoelectric or magnetostrictive fillers also affect the performance. While filler particles of any size that can "fit into" the proppant particles can be used, there are some advantages of using fillers that are not larger than a few microns in size. At the other extreme, however, the piezoelectric or magnetostrictive performance often declines significantly when the particles become exceedingly small. Consequently, one often finds an optimum particle size that depends on the composition of the material and on the method that was used in its preparation. The piezoelectric or magnetostrictive particles used in preferred embodiments of the invention are powders possessing an average size that ranges from approximately 100 nanometers to approximately 5000 nanometers (5 microns) depending on the particle composition and on how the particle was prepared. Within this range, the average size subrange of greatest interest for the preparation of the most preferred embodiments is from approximately 200 nanometers to approximately 1000 nanometers (1 micron).

As a non-limiting illustrative example, we note that the "untagged" proppants (not containing any dispersed piezoelectric or magnetostrictive materials) that are modified to obtain the most preferred embodiments of the invention possess a true density in the range of 1.00 to 1.11 $g/cm^3$. (For simplicity, in all further discussion, the term "density" will be used to represent the "true density".) This range is far lower than the densities of strongly piezoelectric materials such as PZT and giant magnetostrictive materials such as Terfenol-D. Consequently, the density increases as the volume fraction of piezoelectric or magnetostrictive material dispersed in a proppant is increased. In preferred embodiments, the quantity of dispersed piezoelectric or magnetostrictive material ranges from 0.01% by volume up to a maximum value chosen such that a proppant containing dispersed piezoelectric or magnetostrictive materials has a density in the range that is commonly considered to be "lightweight" by workers in the field of the invention (not exceeding 1.75 g/cm$^3$). In the most preferred embodiments, the quantity of dispersed piezoelectric or magnetostrictive material ranges from 0.1% by volume up to a maximum value that is chosen such that a proppant containing dispersed piezoelectric or magnetostrictive materials has a density in the range that is commonly considered to be "ultralightweight" by workers in the field of the invention (not exceeding 1.25 g/cm$^3$).

The maximum volume fraction of a piezoelectric or magnetostrictive material for which the density of the proppant remains within the preferred and most preferred limits of no greater than 1.75 g/cm$^3$ or no greater than 1.25 g/cm$^3$, respectively, depends strongly on the density of the piezoelectric or magnetostrictive material. Consequently, an important general principle in the design of preferred and most preferred embodiments is that, when comparing candidate piezoelectric or magnetostrictive filler materials that possess such responses of comparable strength (and hence of comparable detectability), it is generally preferable to select the material that has the lowest density.

As a non-limiting illustrative example of how the density of a dispersed piezoelectric or magnetostrictive material may determine the maximum volume fraction at which the density of an embodiment of the invention reaches the upper density limits of what are commonly defined as "ultralightweight" or "lightweight" proppants, consider embodiments where FracBlack™ thermoset nanocomposite beads of the Sun Drilling Products Corporation are modified by dispersing particles of the giant magnetostrictive alloy Terfenol-D. FracBlack™ has a density of roughly 1.054 g/cm$^3$ and Terfenol-D has a density of roughly 9.2 g/cm$^3$. Consequently, the density of an exemplary embodiment of the invention where Terfenol-D particles are dispersed in FracBlack™ beads would reach 1.25 g/cm$^3$ at a Terfenol-D content of approximately 2.4% by volume (approximately 17.7% by weight) and 1.75 g/cm$^3$ at a Terfenol-D content of approximately 8.5% by volume (approximately 44.8% by weight).

More generally, the density, D, of an embodiment of the invention can be estimated via a simple linear relationship in terms of the volume fractions and densities of the components. If the volume fraction of the unmodified material is denoted as $V_u$, then the dispersed piezoelectric or magnetostrictive particle volume fraction equals $(1-V_u)$. The relationship is $D=D_1 \times V_u + D_2 \times (1-V_u)$ where $D_1$ is the density of the unmodified material and $D_2$ is the density of the piezoelectric or magnetostrictive additive. In the specific example given in the paragraph above, the calculations were carried out by using this equation with $D_1=1.054$ g/cm$^3$, $D_2=9.2$ g/cm$^3$, and D=1.25 g/cm$^3$ or D=1.25 g/cm$^3$, and solving for the value of $V_u$, finally to obtain the volume percentage of Terfenol-D as $100 \times (1-V_u)$.

In addition to reactive monomers, optional nanofiller(s), and piezoelectric and/or magnetostrictive filler materials, the polymer precursor mixture used in preparing the preferred embodiments of the invention may further comprise additional formulation ingredients selected from the group consisting of initiators, catalysts, inhibitors, dispersants, stabilizers, rheology modifiers, impact modifiers, buffers, antioxidants, defoamers, plasticizers, pigments, flame retardants, smoke retardants, or mixtures thereof.

The present disclosure may be embodied in other specific forms without departing from the spirit or essential attributes of the disclosure. Accordingly, reference should be made to the appended claims, rather than the foregoing specification, as indicating the scope of the disclosure. Although the foregoing description is directed to the preferred embodiments of the disclosure, it is noted that other variations and modification will be apparent to those skilled in the art, and may be made without departing from the spirit or scope of the disclosure.

What is claimed is:

1. A composite proppant composition containing a polymer matrix and fillers whose electromagnetic properties change at a detectable level under a mechanical stress dispersed in the polymer matrix.

2. The composition of claim 1, wherein the mechanical stress is the closure stress of a fracture.

3. The composite proppant composition of claim 1, wherein the composite proppant composition contains from approximately 0.001% to approximately 75% by volume of the dispersed fillers.

4. The composite proppant composition of claim 1, wherein the dispersed fillers comprise piezoelectric particles, magnetostrictive particles, or mixtures thereof dispersed in a thermoset polymer matrix.

5. The composite proppant composition of claim 4, wherein the piezoelectric fillers comprise a ferroelectric material.

6. The composite proppant composition of claim 4, wherein the piezoelectric fillers comprise piezoelectric ceramics with a perovskite crystallographic structure type.

7. The composite proppant composition of claim 4, wherein the piezoelectric fillers comprise lead zirconate titanate (PZT) or barium titanate.

8. The composite proppant composition of claim 4, wherein the composite proppant composition comprises a PZT alloy manifesting a strong piezoelectric effect or Terfenol-D manifesting giant magnetostrictive behavior.

9. The composite proppant composition of claim 4, wherein the piezoelectric and magnetostrictive fillers are powders possessing an average size that ranges from approximately 100 nanometers to approximately 5000 nanometers (5 microns).

10. The composite proppant composition of claim 9, wherein the piezoelectric or magnetostrictive particles are powders possessing an average size that ranges from approximately 200 nanometers to approximately 1000 nanometers (1 micron).

11. The composite proppant composition of claim 4, wherein the piezoelectric particles, magnetostrictive particles are substantially spherical in shape.

12. The composite proppant composition of claim 4, wherein the piezoelectric particles, magnetostrictive particles have a roundness of at least 0.7.

13. The composite proppant composition of claim 4, wherein the piezoelectric particles, magnetostrictive particles have a sphericity of at least 0.7, as measured by the use of a Krumbien/Sloss chart.

14. The composite proppant composition of claim 1, wherein the composite proppant composition further comprises nanofiller particles possessing a length that is less than 500 nanometers in at least one principal axis direction are dispersed in said polymer matrix.

15. The composite proppant composition of claim 14, wherein the nanofiller particles are carbon black.

16. The composite proppant composition of claim 1, wherein the polymer matrix is a thermoset polymer matrix containing an impact modifier.

* * * * *